May 11, 1926.  
H. M. H. REUFEL  
1,584,650  
APPARATUS FOR DETERMINING THE SPHERICAL LUMINOUS INTENSITY OF LIGHT SOURCES  
Filed April 18, 1924    2 Sheets-Sheet 1

Inventor:  
Heinrich M. H. Reufel,  
by *Alexander S. Lunt*  
His Attorney.

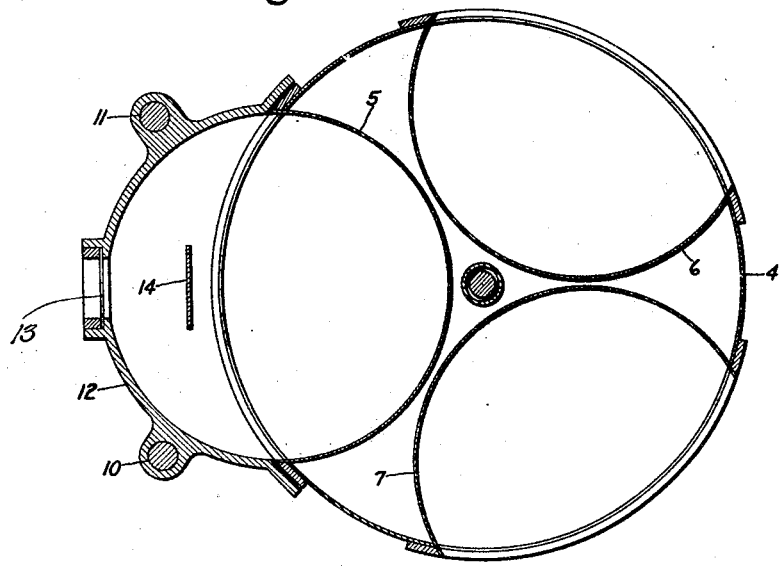
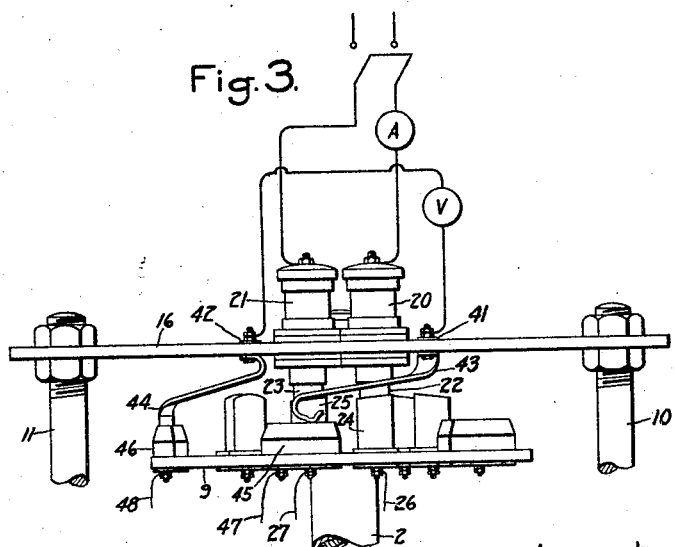

Patented May 11, 1926.

1,584,650

UNITED STATES PATENT OFFICE.

HEINRICH M. H. REUFEL, OF EINDHOVEN, NETHERLANDS, ASSIGNOR TO GENERAL ELECTRIC COMPANY, A CORPORATION OF NEW YORK.

APPARATUS FOR DETERMINING THE SPHERICAL LUMINOUS INTENSITY OF LIGHT SOURCES.

Application filed April 18, 1924. Serial No. 707,404.

This invention relates to improvements in apparatus for ascertaining by means of a sphere photometer the spherical luminous intensity of light sources and more particularly of electric lamps.

In the manufacture of electric lamps it frequently occurs that the luminous intensity of the finished product must be inspected and it is therefore of great importance that this inspection should be promptly and easily effected.

It is known to measure the spherical luminous intensity of a light source by means of a sphere photometer. The light source is located within a sphere having a diffusing inner surface which reflects the light and has a window for example of milk glass, a screen being provided between the window and the light source to prevent the window from being struck by direct rays. The luminous intensity of the window is measured by any known means, said intensity being a measure of the spherical luminous intensity of the light source. In the apparatus according to the present invention, the spherical surface of the sphere photometer has a stationary portion in which the window is provided, and a remaining rotatable portion, to which the device for holding the light source is secured.

The screen that serves to prevent a direct illumination of the window by the source of light is preferably secured to the stationary portion of the spherical surface.

By moving the rotary portion of the spherical surface into a predetermined position, the light source can be easily put into place in the said apparatus and by moving said rotary portion into the position in which a closed spherical surface is formed, the luminous intensity can be measured, whereupon the movable portion can be moved into a position, in which the light source can be easily removed; a further important simplification is introduced if a number of portions of a sphere are rotatable around a common vertical central shaft so that each portion is capable of successively forming a closed spherical surface with the stationary portion.

If, for example, three rotary portions are provided, one of them may be moved into the position in which the source of light is measured, and simultaneously the light source, the intensity of which has been measured may be removed from one of the other two portions and a new source of light be located in the third portion.

The apparatus according to the present invention is particularly adapted for measuring the spherical luminous intensity of electric lamps. The lamps are, for example, suspended by means of their leading-in wires in the rotary portions of the sphere photometer. In this case preferably each of the spherical portions that are rotatable in common contains a device for suspending a lamp, said device also serving for the supply of current, electric contacts being so mounted that a lamp is supplied with current in that position of a rotary portion in which it is measured, whereas in the other positions the suspension device cannot be supplied with current.

In the positions in which no measurement is effected, it is consequently not dangerous to touch the suspension device by hand. To the central shaft, to which the portions of the sphere are secured and around which they are rotatable in common, a table may be secured on which for each spherical portion is mounted a set of current supply contacts cooperating with one set of stationary contacts.

If the apparatus according to the present invention is intended for measuring the luminous intensity of electric lamps, it is preferably provided for each of the spherical portions which are rotatable on the central shaft with a set of voltmeter-contacts making contact in the position in which the luminosity is measured with one set of stationary contacts.

The accompanying drawing diagrammatically illustrates an apparatus embodying the present invention. In the said drawing:

Figure 2 is a horizontal section taken on the line A—B of Figure 1, and

Figure 3 is a view on a large scale of the uppermost part of the apparatus with the various electric contacts, showing also the accessory circuit arrangement.

Figure 1:
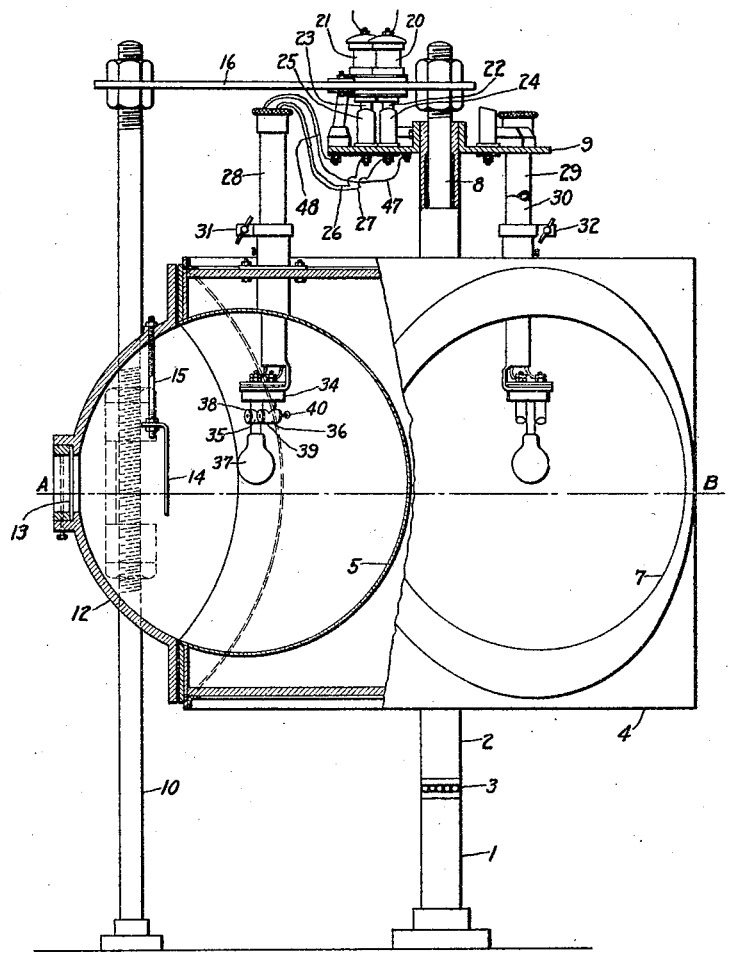
Figure 1 is a view and partly a vertical section of an apparatus for measuring the luminous intensity of electric lamps, said apparatus comprising three rotary spherical portions.

The apparatus shown on the drawing comprises a vertical column 1 carrying a vertical post 8, on which a column 2 is rotatable, said column resting on the column 1 by means of a ball-bearing 3.

To the column 2 is connected a housing 4 in which three portions of a sphere 5, 6 and 7 are mounted, and on a table 9 at the top end of the said column are provided several contacts for the supply of current and for the voltmeter.

The stationary part of the sphere photometer is secured to two vertical columns 10 and 11. The stationary part of the spherical surface 12 is consequently also fixed to them, and is provided with a window 13 consisting for example of milk glass. The luminous intensity of this window is measured by known means not shown on the drawing.

A screen 14 is suspended by means of bolts 15 on the stationary part 12 and is arranged between a light source and the window 13 in order to prevent direct illumination of the latter.

A table 16 serving for carrying the stationary electric contacts of the apparatus is fixed by means of nuts to the top end of the vertical shaft 8 and of the columns 10 and 11.

In the apparatus shown on the drawing, the table 9 is provided with a set of current supply contacts and a set of voltmeter contacts for each lamp, and a set of current supply contacts as well as a set of voltmeter contacts is fixed to the table 16.

During the rotation of the central post 2 with the housing 4, the contacts engage each other successively so that current is supplied to a lamp in the position in which it is measured, in which position also the voltmeter contacts engage each other, whereas in the other positions in which the lamp is removed or put into place respectively the suspension devices are not supplied with current.

Stationary current supply contacts 20 and 21 are connected, with the interposition of an amperemeter A, to some suitable source of current.

On the bottom side the contacts 20 and 21 carry resilient contact pieces 22 and 23 consisting of some suitable material, for example, of carbon or of a highly refractory metal such as tungsten.

In the position in which the apparatus is shown on the drawing, the contact pieces 22 and 23 engage contacts 24 and 25 mounted on the rotary table 9. To these contacts wires 26 and 27 are connected which lead through a tube 28 to the suspension device for the lamp. The tube 28 is vertically movable so as to permit of its position being adjusted according to the dimensions of the lamps under test, and can be held in any position by means of a clamping-screw 31. The tube 28 carries at its bottom end a small table 34 to which clamps 35 and 36 for the lamp are fixed. The leading-in wires for a lamp 37 are suspended between the pieces 35 and 36 and plates 38 and 39 which are resiliently kept engaged.

On the table 16 are also provided two voltmeter contacts 41 and 42 to which contacts springs 43 and 44 are fixed.

The voltmeter V is in conductive connection with the contacts 41 and 42. In the position in which the apparatus is shown on the drawing, the ends of the contact springs 43 and 44 engage contact plates 45 and 46 on the table 9. Wires 47 and 48 connected to these plates pass through the tube 28 to the clamps 35 and 36 so that the voltage of the lamp can be read by means of the voltmeter V.

Similar suspension devices, as for the lamp 37, are provided in the two other rotary spherical portions. The various wires for the suspension devices pass through vertical tubes 29 and 30 which can be held in position by means of clamping screws 32.

The operation of the apparatus according to the invention is briefly as follows:

A lamp is suspended in one of the rotary portions of the spherical surface. The post 2 is rotated by hand until the portion under consideration forms a closed spherical surface with the stationary part 12, i. e., in the position in which the portion 5 is shown on the drawing. In this position the rotatable current supply contacts engage the stationary contacts 20 and 21, whereby the filament of the lamp is lighted so that the luminous intensity of the lamp can be measured. At the same time the strength of the current is read on the amperemeter A and the voltage of the lamp on the voltmeter V so that both the luminous intensity and the consumption of energy of the lamp are determined. While the measurement is carried on, a new lamp is suspended in another rotary portion, for example, in the portion 7. When the measurement is finished, the post 2 is turned into a further position, the portion 5 being thus replaced by the portion 7. Whilst the luminous intensity of the lamp is measured in the portion 7, the lamp in the portion 5 is removed and a new lamp is located in the portion 6.

It is, of course, obvious that the rotary part is provided with some suitable means so as to permit of its being moved into and locked in each active position. A resilient pawl which enters into a slot may serve for this purpose. It is also obvious that the rotary part instead of by hand, can also be driven mechanically in some suitable manner.

What I claim as new and desire to secure by Letters Patent of the United States, is,—

1. A device for measuring the spherical luminous intensity of a light source comprising a photometer, said photometer comprising in turn a stationary section of a chamber and a series of chamber portions all mounted on a shaft to rotate about a common axis so that each portion is capable of successively forming with the stationary portion a spherical photometer closure.

2. A device for measuring the spherical luminous intensity of a light source comprising a photometer, said photometer comprising in turn a stationary spherical portion, a series of other spherical portions all mounted on a common shaft to rotate about a common axis so that each portion is capable of successively forming with the stationary portion a photometric sphere, a holder associated with each rotatable portion for supporting a light source, each holder so located that when the corresponding rotatable portion forms a sphere with the stationary portion the light source in the corresponding holder stands in the measuring position, and electric contacts mounted for supplying current to each lamp in the measuring position only.

3. A device for measuring the spherical luminous intensity of a light source comprising a photometer, said photometer comprising in turn a stationary spherical portion, a series of other spherical portions all mounted on a common shaft to rotate about a common axis so that each portion is capable of successively forming with the stationary portion a sphere, a holder associated with each rotatable portion for supporting a light source, each holder so located that when the corresponding rotatable portion forms a sphere with a stationary portion the light source in the holder stands in the measuring position, electric contacts supported to rotate with said shaft for supplying current to each lamp in the measuring position and to prevent the supply of current thereto when in some other position, said contacts being adapted to cooperate with a set of stationary contacts.

4. A device for measuring the spherical luminous intensity of a light source comprising a photometer, said photometer comprising in turn a stationary spherical portion, a series of other spherical portions all mounted on a common shaft to rotate about a common axis so that each portion is capable of successively forming with the stationary portion a substantially closed sphere, a lamp socket associated with each rotatable portion for supporting a light source, each socket so located that when the corresponding rotatable portion forms a sphere with a stationary portion the light source in the socket stands in the measuring position, and electric contacts supported to rotate with said shaft, and a cooperating set of stationary contacts for measuring the voltage of the light source when the light source is in the measuring position only.

In witness whereof, I have hereunto set my hand this eighteenth day of March, 1924.

HEINRICH M. H. REUFEL.